(12) United States Patent
Camali et al.

(10) Patent No.: US 11,219,920 B2
(45) Date of Patent: Jan. 11, 2022

(54) SYSTEM AND METHOD FOR MAKING AND APPLYING A NON-PORTLAND CEMENT-BASED MATERIAL

(71) Applicant: En-Tech Corporation, Closter, NJ (US)

(72) Inventors: Eugene James Camali, Bellair Shores, FL (US); Andreas Schrell, Hofheim (DE); Robert George Benz, Cranford, NJ (US)

(73) Assignee: En-Tech Corporation, Closter, NJ (US)

( * ) Notice: Subject to any disclaimer, the term of this patent is extended or adjusted under 35 U.S.C. 154(b) by 0 days.

(21) Appl. No.: 16/691,915

(22) Filed: Nov. 22, 2019

(65) Prior Publication Data

US 2020/0087206 A1 Mar. 19, 2020

Related U.S. Application Data

(60) Division of application No. 15/344,062, filed on Nov. 4, 2016, now Pat. No. 10,865,146, which is a
(Continued)

(51) Int. Cl.
*B05D 1/02* (2006.01)
*C04B 28/08* (2006.01)
(Continued)

(52) U.S. Cl.
CPC ............ *B05D 1/02* (2013.01); *B28C 5/026* (2013.01); *B28C 7/165* (2013.01); *B28C 9/0463* (2013.01);
(Continued)

(58) Field of Classification Search
None
See application file for complete search history.

(56) References Cited

U.S. PATENT DOCUMENTS 2,700,535 A 1/1955 Harrington
3,107,901 A * 10/1963 Zimmerman ......... B28C 9/0454
366/5
(Continued)

FOREIGN PATENT DOCUMENTS

CN 1693632 A 11/2005
CN 102648167 A 8/2012
(Continued)

OTHER PUBLICATIONS

Examination Report No. 1 issued in counterpart Australian Divisional Patent Application No. 2019284021 dated Jul. 17, 2020.
(Continued)

*Primary Examiner* — Michael P. Rodriguez
(74) *Attorney, Agent, or Firm* — Mark H. Whittenberger; Holland & Knight LLP

(57) ABSTRACT

A system and method for applying a construction material is provided. The method may include mixing one or more of 4%-45% volcanic rock by weight, greater than 0%-40% latent hydraulic material by weight, 10%-45% alkaline component by weight, and 20%-90% aggregate by weight to produce a dry binding agent mixture, using a dry mixer; and combining the dry binding agent mixture with water at a nozzle to produce a sprayable concrete compound.

4 Claims, 3 Drawing Sheets

Related U.S. Application Data continuation-in-part of application No. 14/705,534, filed on May 6, 2015, now Pat. No. 9,896,379.

(51) Int. Cl.
| | |
|---|---|
| *B28C 5/02* | (2006.01) |
| *C04B 28/00* | (2006.01) |
| *C04B 14/06* | (2006.01) |
| *E03F 3/06* | (2006.01) |
| *B28C 7/16* | (2006.01) |
| *B28C 9/04* | (2006.01) |
| *E01C 19/18* | (2006.01) |
| *E01C 7/14* | (2006.01) |
| *E02D 29/12* | (2006.01) |

(52) U.S. Cl.
CPC ............ *C04B 14/06* (2013.01); *C04B 28/006* (2013.01); *C04B 28/008* (2013.01); *C04B 28/08* (2013.01); *E03F 3/06* (2013.01); *E01C 7/147* (2013.01); *E01C 19/18* (2013.01); *E02D 29/128* (2013.01); *E03F 2003/065* (2013.01); *Y02P 40/10* (2015.11); *Y02W 30/91* (2015.05)

(56) References Cited

U.S. PATENT DOCUMENTS

| | | | |
|---|---|---|---|
| 4,066,471 | A | 1/1978 | Burke |
| 4,106,111 | A | 8/1978 | Rose |
| 4,239,397 | A | 12/1980 | Sandell et al. |
| 4,299,761 | A | 11/1981 | Emmons et al. |
| 4,349,386 | A | 9/1982 | Davidovits |
| 4,472,199 | A | 9/1984 | Davidovits |
| 5,342,595 | A | 8/1994 | Davidovits |
| 5,366,547 | A | 11/1994 | Brabston et al. |
| 5,976,241 | A | 11/1999 | Kim et al. |
| 6,641,658 | B1 | 11/2003 | Dubey |
| 2008/0153942 | A1 | 6/2008 | Tejada Juarez |
| 2011/0132230 | A1 | 6/2011 | Han et al. |
| 2011/0259245 | A1 | 10/2011 | Sperisen et al. |
| 2012/0048147 | A1 | 3/2012 | Gehrig et al. |
| 2012/0152152 | A1 | 6/2012 | Yin et al. |
| 2012/0156381 | A1 | 6/2012 | Allouche et al. |
| 2012/0247369 | A1 | 10/2012 | Ellenrieder et al. |
| 2013/0319294 | A1 | 12/2013 | Gehrig et al. |
| 2014/0264140 | A1* | 9/2014 | Gong .................... C04B 28/006 252/62 |
| 2014/0305342 | A1 | 10/2014 | Perez-Pena |
| 2016/0326052 | A1 | 11/2016 | Camali et al. |

FOREIGN PATENT DOCUMENTS

| | | |
|---|---|---|
| CN | 104016633 A | 9/2014 |
| CN | 104254504 A | 12/2014 |
| CN | 108025970 A | 5/2018 |
| DE | 3623631 C1 | 8/1987 |
| EP | 0352583 A3 | 1/1990 |
| EP | 2428499 A1 | 3/2012 |
| JP | S59-30747 A | 2/1984 |
| JP | H10-25138 A | 1/1998 |
| JP | 2010-280532 A | 12/2010 |
| JP | 2013537163 A | 3/2012 |
| RU | 2235077 C2 | 8/2004 |
| WO | 2011003918 A1 | 1/2011 |
| WO | 2013163009 A1 | 10/2013 |
| WO | 2015049010 A1 | 4/2015 |
| WO | 2015111860 A1 | 7/2015 |

OTHER PUBLICATIONS

Final Office Action issued in related U.S. Appl. No. 16/383,030 dated Jun. 15, 2020.
Notice of Allowance issued in related U.S. Appl. No. 15/344,062 dated Aug. 21, 2020.
Non-Final Office Action issued in related U.S. Appl. No. 15/856,857 dated Sep. 4, 2020.
Non-Final Office Action issued in related U.S. Appl. No. 14/705,534 dated Sep. 13, 2016.
International Search Report issued in related U.S. Appl. No. PCT/US2016/030920 dated Aug. 8, 2016.
Buchwald, Anja, "What are Geopolymers? Current State of Research and Technology, the Opportunities they Offer, and their Significance for the Precast industry", BFT Jul. 2006, Concrete Technology, pp. 42-49 (2006).
Well, Marcel, "Geopoiymer Binders—Ecological and Economic Analyses of Geopolyrner Concrete", BFT12/2011, www.bfit-international.com, pp. 4-17 (2011).
Milliken's Geopolymer Products webpage, http://geopolymers.milliken.com/Pages/products.aspx, 2 pages (accessed on May 6, 2015).
International Search Report issued in related Application Serial No. PCT/US2016/060639 dated Feb. 27, 2017.
Final Office Action issued in counterpart U.S. Appl. No. 14/705,534 dated May 5, 2017.
Office Action issued in counterpart Canadian Patent Application No. 2,985,199 dated Dec. 1, 2017.
Office Action issued in counterpart Japanese Application Serial No. 2017-568460 dated May 1, 2018.
Decision to Grant issued in counterpart Russian Patent Application No. 201738391 dated May 3, 2018.
First Examiner issued in related New Zealand application No. 737589 dated Dec. 20, 2017.
Examination Report issued in counterpart Chinese Patent Application No. 2016800397073.0 dated Sep. 6, 2018.
Non-Final Office Action issued in U.S. Appl. No. 15/344,062 dated Feb. 8, 2019.
Extended European Search Report issued in EP Application No. 16790067.9
Sofi et al., "Engineering properties of inorganix polymer concretes (IPCs)", Cement and Contrete Resea, Pergamon Press, vol. 37, No. 2, Jan. 30, 2007.
Second Office Action issued in CN Application Serial No. 201680039707.0 dated Apr. 28, 2019.
First Examination Report issued in IN Application Serial No. 201717041554 dated May 9, 2019.
Höfler et al. "Shotcrete in Tunnel Construction—Introduction to the basic technology of sprayed concrete" Putzmeister AG, Mar. 2004.
Final Office Action issued in related U.S. Appl. No. 15/344,062 dated Aug. 21, 2019.
Non-Final Office Action issued in related U.S. Appl. No. 15/856,857 dated Jun. 24, 2019.
Non-Final Office Action issued in related U.S. Appl. No. 16/383,030 dated Oct. 4, 2019.
Official Action issued in related Taiwanese Application No. 105114117 dated Oct. 15, 2019.
Non-Final Office Action issued in related U.S. Appl. No. 15/344,062 dated Feb. 21, 2020.
Final Office Action issued in related U.S. Appl. No. 15/856,857 dated Mar. 6, 2020.
Official Action issued in related Russian Application No. 2019117051 dated Feb. 7, 2020.
Communication Pursuant to Articie 94(3) issued in related EP Application No. 16790067.9 dated Mar. 2, 2020.
Supplementary Extended Search Report issued in EP Application No. 16920601.8 dated Mar. 26, 2020.
Decision of Grant together with Report on Results of Examination issued in counterpart Russian Patent Application No. 2019117051 dated Jul. 29, 2020.
Notice of Allowance issued in related U.S. Appl. No. 16/383,030 dated Sep. 18, 2020.
Non-Final Office Action issued in related U.S. Appl. No. 16/691,763 dated Oct. 6, 2020.
Non-Final Office Action issued in related U.S. Appl. No. 16/691,892 dated Oct. 6, 2020.
Communication Pursuant to Article 94(3) EPC in related European Patent Application No. 16790067.9 dated Nov. 23, 2020; 4 pages.

(56) References Cited

OTHER PUBLICATIONS

Japanese Official Action issued in Japanese Application No. 2019-523804 dated Nov. 25, 2020.
Notice of Allowance issued in related U.S. Appl. No. 15/856,857 dated Jan. 13, 2021; 16 pages.
Final Office Action issued in related U.S. Appl. No. 16/691,892 dated May 13, 2021.
Examination Report issued in India Application No. 201717041554 dated May 9, 2019.
Examination Report No. 1 in Australia Application No. 2019284021 dated Jul. 17, 2020.
Notice of Allowance issued in related U.S. Appl. No. 16/691,763 dated Jun. 3, 2021.
Chekhov, A. P. et al. Handbook of concretes and solutions, Kiev, Budivelnik, 1972, p. 31.
Examination Report issued in European Application No. 16920601.8 dated Mar. 4, 2021.
Notice of Allowance issued in related U.S. Appl. No. 14/705,534 dated Sep. 29, 2017.
Office Action issued in Taiwan Application Serial No. 105136165 dated Mar. 8, 2021.
Office Action issued in Chinese Application Serial No. 201680091884.3 dated Apr. 15, 2021.
Search Report issued in European Application No. 20207927.3 dated Apr. 1, 2021.
Examination Report No. 1 issued in counterpart Australian Divisional Patent Application No. 2018201673 dated Dec. 21, 2018.
Office Action issued in Japan Application No. JP 2017-568460 dated Aug. 28, 2018.
Decision of Rejection issued in Chinese Application Serial No. 201680039707.0 dated Dec. 2019.
Russian Official Action dated Feb. 7, 2020 in related application Serial No. 2019117051.
First Examination Report issued in India Application No. 201917020529 dated Dec. 23, 2020.
Notice of Allowance issued in related U.S. Appl. No. 16/691,763 dated Sep. 24, 2021.
Notification of Reexamination dated Oct. 21, 2021 in related Chinese Application Serial No. 2021101801240330.
Second Office Action dated Nov. 1, 2021 in CN Application No. 2021102702444450.
Examination Report No. 1. dated Sep. 4, 2021 in related Australian Application Serial No. 2016428605.

* cited by examiner

SYSTEM AND METHOD FOR MAKING AND APPLYING A NON-PORTLAND CEMENT-BASED MATERIAL

CROSS-REFERENCE TO RELATED APPLICATION

This application is a divisional of U.S. patent application Ser. No. 15/344,062 filed on Nov. 4, 2016, entitled System and Method for Making and Applying a Non-Portland Cement-Based Material, which is a continuation-in-part of application Ser. No. 14/705,534, filed on May 6, 2015, now U.S. Pat. No. 9,896,379, issued Feb. 20, 2018, entitled System and Method for Making and Applying a Non-Portland Cement-Based Material, the contents of which are all incorporated by reference.

TECHNICAL FIELD

This disclosure relates to construction materials and, more particularly, to a method for making and applying construction materials.

BACKGROUND

Existing approaches in the fields of sewer refurbishing and concrete restoration and construction may involve the application of shotcrete, which may be pneumatically projected towards the surface in need of repair or construction. This shotcrete includes materials found in basic concrete, such as, sand, Portland cement, and liquid. At a particular job site, this shotcrete may take the form of either a dry-mix or a wet-mix application. The phrase "dry-mix" typically involves the pneumatic transfer of some or all of the materials in a dry state, through a hose, to a nozzle where an operator may control the application of liquid to the dry-mix at the nozzle prior to the projection of the substance. In contrast, the phrase "wet-mix" typically involves the transfer of a previously mixed concrete, including liquid, through a hose prior to projection.

Some companies have attempted to alter the material composition of the shotcrete in order to obtain certain benefits. Accordingly, some approaches may involve the use of geopolymers. However, these materials are often subject to corrosion as a result of the organic material inherent in these products. For example, Milliken® manufactures various products under their GeoSpray™ and GeoSpray™ AMS line of products. The AMS product may be applied as a pre and/or post-treatment to the GeoSpray™ product. GeoSpray is Portland cement-based and contains only a small portion of a geopolymer. This mixture is not acid stable. AMS contains organics to combat the effects of acids on Portland cement based concrete and of microbial induced corrosion that happens with Portland cement based materials.

SUMMARY OF DISCLOSURE

In a first implementation, a method for applying a construction material is provided. The method may include mixing blast furnace slag material, geopolymer material, alkali-based powder, and sand at a batching and mixing device to generate a non-Portland cement-based material. The method may also include transporting the non-Portland cement-based material from the batching and mixing device, through a conduit to a nozzle and combining the transported non-Portland cement-based material with liquid at the nozzle to generate a partially liquefied non-Portland cement-based material. The method may further include pneumatically applying the partially liquefied non-Portland cement-based material to a surface.

One or more of the following features may be included. In some embodiments, the geopolymer material is at least one of volcano rock flour or pumice The alkali-based powder may include silicate. Mixing may be performed as a dry-mix. The non-Portland cement-based material may be inorganic. Mixing may be performed at a mobile batching and mixing vehicle. The non-Portland cement-based material may include at least one of clay, gneiss, granite, liparite, andesite, picrite, potassic feldspar, albite, pumice or zeolite. Mixing may include mixing at a portable gun, which is configured to receive the non-Portland cement-based material from the batching and mixing device. The components of the non-Portland cement-based material may include a Blaine fineness value of approximately 2500-5000 $cm^2/g$.

In another implementation, a system for applying a construction material is provided. The system may include a batching and mixing device configured to batch and mix blast furnace slag material, geopolymer material, alkali-based powder, and sand to generate a non-Portland cement-based material. The system may also include a conduit configured to transport the non-Portland cement-based material from the batching and mixing device. The system may further include a nozzle configured to receive the non-Portland cement-based material and combine the transported non-Portland cement-based material with liquid to generate a partially liquefied non-Portland cement-based material, wherein the nozzle is further configured to pneumatically apply the partially liquefied non-Portland cement-based material to a surface.

One or more of the following features may be included. In some embodiments, the geopolymer material may be at least one of volcano rock flour or pumice. The alkali-based powder may include silicate. Mixing may be performed as a dry-mix. The non-Portland cement-based material may be inorganic. Mixing may be performed at a mobile batching and mixing vehicle. The non-Portland cement-based material may include at least one of clay, gneiss, granite, liparite, andesite, picrite, potassic feldspar, albite, pumice or zeolite. Mixing may include mixing at a portable gun, which is configured to receive the non-Portland cement-based material from the batching and mixing device. The components of the non-Portland cement-based material may include a Blaine fineness value of approximately 2500-5000 cm2/g.

In another implementation, a non-Portland cement-based construction material is provided. The non-Portland cement-based construction material blast furnace slag material, volcano rock flour, alkali-based powder, and sand. In some embodiments, the alkali-based powder may be silicate.

The details of one or more implementations are set forth in the accompanying drawings and the description below. Other features and advantages will become apparent from the description, the drawings, and the claims.

DETAILED DESCRIPTION OF THE EMBODIMENTS

Embodiments of the present disclosure are directed towards a construction material having an alkali-activated binder (i.e. non-Portland cement based) and a system and method for making and applying the same. Although many of the examples included herein are discussed in the context of concrete rehabilitation it should be noted that the construction material described herein may be used in any suitable application. Some of these may include, but are not limited to, sewer rehabilitation projects, any concrete structure undergoing an acid attack, etc.

Figure 1:
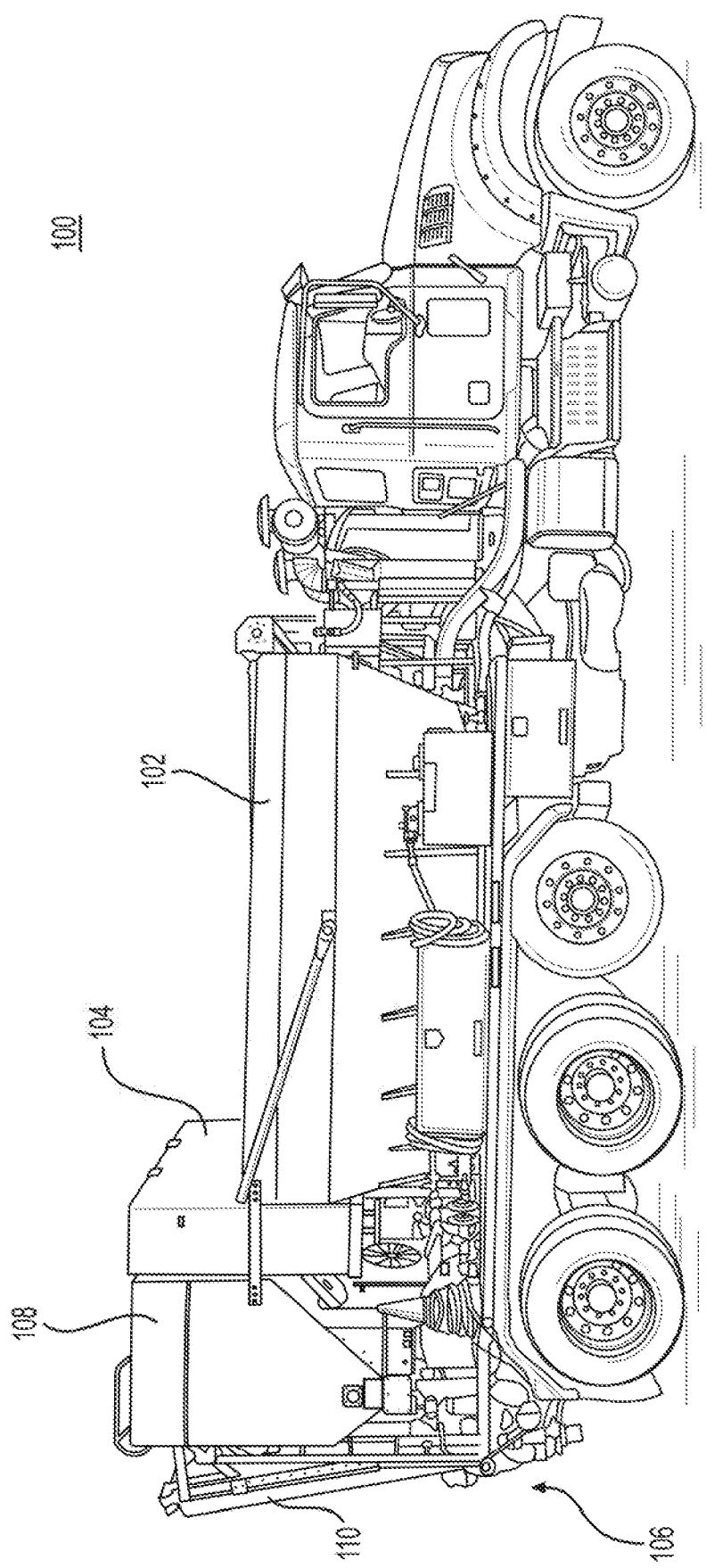
FIG. 1 is a side view of a mobile system configured to batch, mix and apply a non-cement-based material according to an embodiment of the present disclosure.
Figure 2:
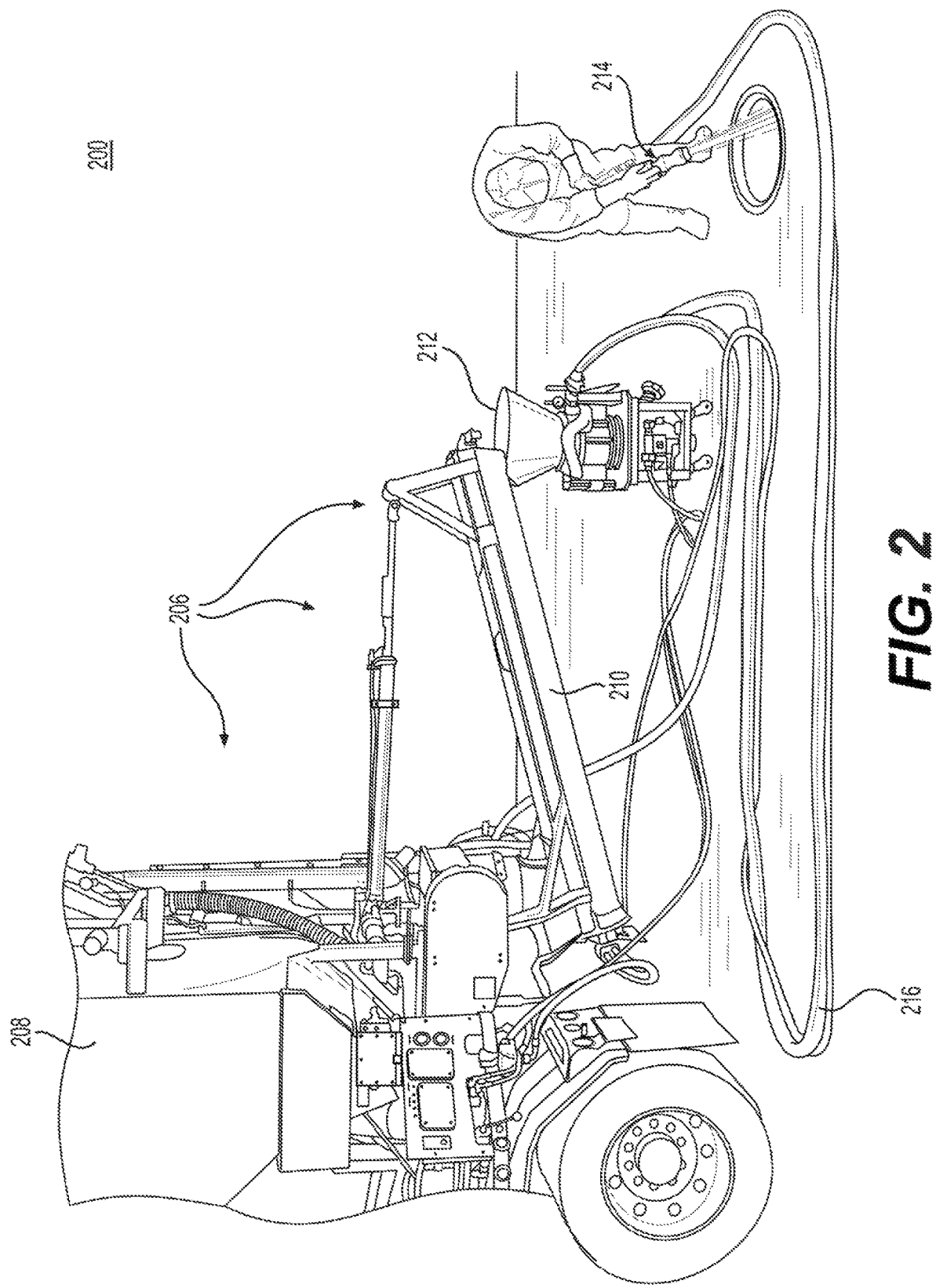
FIG. 2 is a side rear view of a mobile system configured to batch, mix and apply a non-cement-based material according to an embodiment of the present disclosure.
Figure 3:
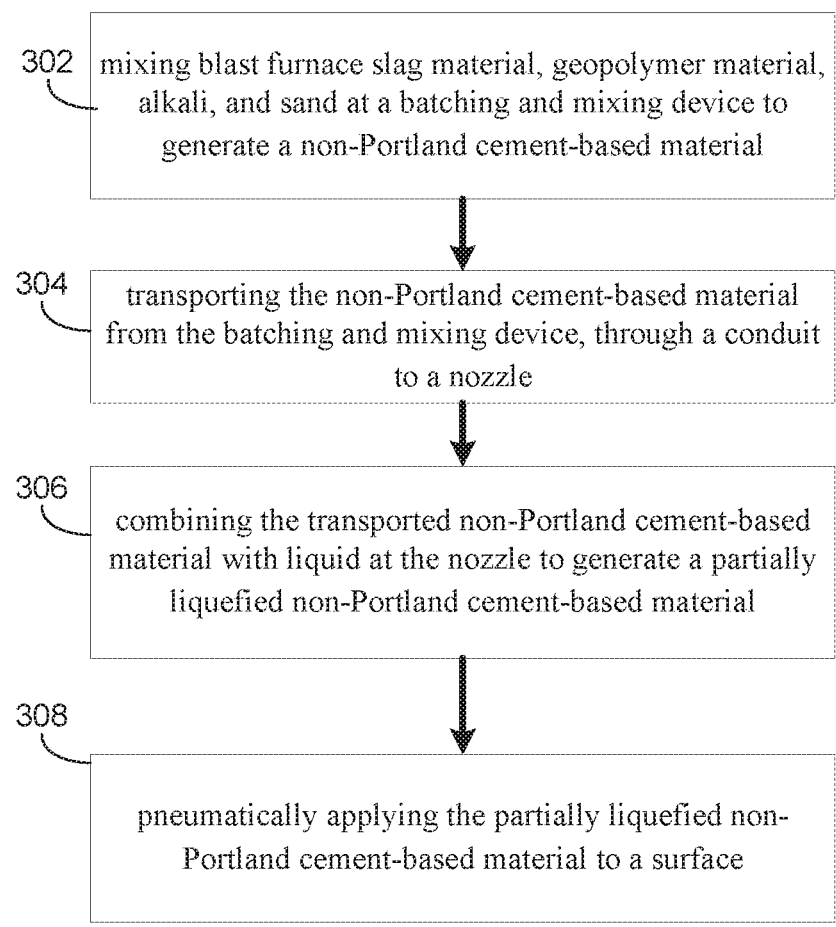
FIG. 3 is a flowchart depicting operations consistent with a non-cement-based application process according to an embodiment of the present disclosure.

Referring to FIG. 1, there is shown a mobile batching and mixing vehicle 100 having a number of containers, compartments, and devices associated therewith. In some embodiments, vehicle 100 may include first container 102, which may be configured to store sand or other materials. Storage unit 104 may be configured to store water or other liquids. Vehicle 100 may further include a batching and mixing device 106, which may include a number of components, some of which may include, but are not limited to, second container 108, adjustable delivery mechanism 110, and portable gun 212. As is shown in FIG. 2, portable gun 212 may be connected to nozzle 214 via conduit or hose 216.

In some embodiments, mobile batching and mixing vehicle 100 may be configured to batch, mix and apply a non-Portland cement-based construction material. This material may be batched and mixed at the vehicle (e.g. within batching and mixing device 106) or prior to being placed within second container 108. This material may be transported to nozzle 214, where it may be mixed with liquid from storage unit 104, prior to being applied to the surface in need of construction OR repair. The specifics of the non-Portland cement based construction material are discussed in further detail herein below.

In some embodiments, the non-Portland cement based construction material described herein may have better strength values as compared to existing materials, a high resistance and no reactivity versus inorganic and organic acids and additionally high early strength values. The non-Portland cement based construction material may display an improved resistance to high temperatures, as well as significantly higher strengths and durability properties. In one example, the non-Portland cement based construction material may have an excellent resistance to strong inorganic acids. Furthermore, the products produced from the non-Portland cement based construction material may have excellent compressive strength and a very low thermal conductivity. The material may include a dry mix (e.g., a binding agent mixture) of blast furnace slag material, geopolymer material, alkali-based powder, and sand at a batching and mixing device to generate the non-Portland cement-based material. In some embodiments, the binding agent mixture may be used to generate the non-Portland cement based material.

In some embodiments, a binding agent mixture may include one or more of 4%-45% volcanic rock by weight, 0%-40% latent hydraulic material by weight, 10%-45% an alkaline component by weight, selected from the group: sodium silicate, alkali hydroxide, alkali carbonate, and mixtures thereof, as well as 20%-90% aggregates by weight. In some embodiments, the binding agent mixture may include sulfate ($SO_4^{2-}$) in the form of contaminants in a portion of less than 1% by weight. In some embodiments, calcium may be contained in the binding agent mixture in the form of calcium oxide (CaO) in a portion of no more than 5% by weight.

In some embodiments, the non-Portland cement based construction material may include various types of geopolymer material. Geopolymer materials may include, but are not limited to, volcanic rock. As such, the terms "geopolymer materials" and "volcanic rock" may be used interchangeably within the scope of the present disclosure. Some of these geopolymer materials may include, but are not limited to, pozzolanic material, which may react with strong alkali and mixing that blend with the sand and/or grit. Pozzolans, or pozzolanic materials, may be synthetic or natural rocks made of silicone dioxide, clay, limestone, iron oxide and alkaline substances, which may be obtained through the effects of heat. When combined with calcium hydroxide and water, they can form bonds. Natural pozzolans (pozzolana) may be magmatic rocks, such as volcanic tuff, or Rhine trass in Germany, but may also be sedimentary rocks containing a high portion of soluble silicic acid, and sometimes may also be reactive aluminum oxide (clay). In some embodiments, pozzolan may be a readily-available raw material and may be used as the volcanic rock or geopolymer material in the non-Portland cement based construction material. Natural material like volcano rocks or some others may also be used, however, these may be more desirable if used in smaller portions as very fine powder (e.g., such as volcano rock flour).

In some embodiments, the non-Portland cement based construction material may include any number of pozzolanic materials, some of which may include, but are not limited to finely ground clay, gneiss, granite, liparite, andesite, picrite, potassic feldspar, albite, pumice, zeolite, etc., as well as mixtures thereof. These materials may be used in a ground form, calcinated and/or noncalcinated. Additionally and/or alternatively, all raw materials containing sufficient amounts of reactive (e.g., metastable, vitreous) $SiO_2$ and $Al_2O_3$, including, but not limited to, ashes, pozzolans, slags may also be suitable for embodiments of the present disclosure.

In some embodiments, the non-Portland cement based construction material may include a latent hydraulic material. A latent hydraulic material as used herein may include, but is not limited to, fly ash, kaolin, trass, granulated slag (e.g., blast furnace slag material) and/or a mixture thereof. In one example, fly ash in the form of lignite fly ash and anthracite fly ash may be used. In some embodiments, the pozzolanic material may include active silicates like slag sand or fly ash. In some embodiments, brick dust (fired clay) or fly ash from plants burning anthracite or lignite may be referred to as synthetic pozzolans. As such, the term "fly ash" as used herein may refer to an unnatural or synthetic pozzolan. In some embodiments, the particularly favorable properties of fly ash may be caused by a favorable proportion of silicon dioxide to aluminum oxide to calcium oxide, which may distinguish these substances. However, and as will be discussed in greater detail below, fly ash may contain portions of sulfates and/or calcium oxide. Therefore, if fly ash is used in the binding agent mixture, a type of fly ash may be used that contains the specified substances in a favorable proportion.

In some embodiments, the non-Portland cement based construction material may include an alkali-based powder material and/or various mixing liquids. Some possible mixing liquids may include, but are not limited to, potassium and sodium water glass, alkali hydroxides, etc. In some embodiments, the alkali, or alkaline component may be sodium silicate in the form of an aqueous sodium silicate or in the form of a powdered sodium silicate. In some embodiments, a spray-dried silicate may be used. When alkali hydroxides or alkali carbonates are used, these may be used in their liquid form, or as a powder or granulate.

In some embodiments, the reaction between the $SiO_2$/$Al_2O_3$-containing components and the alkaline mixing liquid may result in alumino-silicates having a tridimensional structure. These framework structures allow for the creation of a construction material requiring no Portland cement in the compound.

As discussed above, the binding agent mixture and/or components of the binding agent mixture may include calcium. In some embodiments, calcium may be contained in the binding agent mixture in the form of portions of calcium oxide (CaO). These portions of CaO in the binding agent mixture and/or non-Portland cement based construction material may lead to calcium silicate hydrates after reacting with aqueous alkalis and/or other components, which may have known disadvantageous chemical properties. Furthermore, calcium ions, as a component of cement-based crystal structures, frequently display an undesired solubility, which may lead to a weakening of the cement structure over time. For this reason, a lowest possible portion of calcium may be used. Embodiments of the present disclosure utilizing $SiO_2$ in the form of soluble silicic acids, iron oxide, $Al_2O_3$ in the form of aluminates and calcium oxide may be implemented with water-soluble silicates or strong alkalis, thus resulting in an inorganic binding system having little or nearly no calcium.

In some embodiments, calcium may be contained in the binding agent mixture in the form of calcium oxide (CaO), having a portion of no more than 5% by weight. In some embodiments, calcium in the form of calcium oxide may be contained in the binding agent mixture in a portion of no more than 2% by weight. Additionally and/or alternatively, calcium in the form of calcium oxide may be contained in a portion of no more than 1% by weight.

In some embodiments, sulfate ($SO_4^{-2}$) may be contained in the binding agent mixture in the form of contaminants, and/or in a portion of less than 1% by weight. Sulfate in the form of its salt is an environmentally relevant substance. The increasing contamination of the environment with sulfates is caused by agricultural fertilization and waste management. It has been proven that sulfates lead to acidification of the ground and groundwater. Due to a generally high solubility in water, it is easily transported in groundwater, seepage, and surface water flows, which ultimately increases the effects of the acidification in the sphere of materials containing sulfates in waste storage facilities. Sulfates are reduced to sulfites through microbial processes, which in turn can have a negative effect on flora and fauna. In some embodiments, the portion of sulfate in binding agent mixtures may be kept as low as possible to avoid at least these negative effects. In some embodiments, sulfate ($SO_4^{2-}$) may be contained in the binding agent mixture in the form of contaminants, and/or in a portion of less than 0.5% by weight. In one embodiment, the sulfate may be contained in a portion of less than 0.25% by weight.

In some embodiments, the non-Portland cement based construction material may include sand. However, other aggregates may be used as well. For example, other aggregates for use in a binding agent mixture as a non-cement based concrete may include, but are not limited to, gravel, sand, basalt, etc. Other materials used for non-cement based concrete may also be used within the scope of the present disclosure. Additionally, and in various applications, perlite, expanded shale, pumice or a mixture thereof may also be used. In some embodiments, the binding agent mixture may include 20% to 70% aggregates by weight. Additionally and/or alternatively, 20% to 50% aggregates by weight may be included in the binding agent mixture. In one embodiment, 20% to 40% aggregates by weight may be included in the binding agent mixture.

In some embodiments, the binding agent mixture may also contain water. Therefore, in one embodiment, a particularly high resistance to various chemicals and in particular to acids may be demonstrated by a binding agent mixture composed of 4% to 45% volcanic rock (e.g., geopolymer material) by weight, 0% to 40% latent hydraulic material (e.g., blast furnace slag material) by weight, 10% to 45% alkaline component (e.g., alkali) by weight, 20% to 90% aggregates (e.g., sand) by weight, and/or water. In some embodiments, the alkaline component may include sodium silicate, alkali hydroxide, and/or alkali carbonate. Additionally and/or alternatively, the binding agent mixture may include sulfate ($SO_4^{2-}$) in the form of contaminants, and/or in a portion of less than 1% by weight. In some embodiments, the binding agent mixture may include calcium in the form of calcium oxide (CaO) in a portion of no more than 5% by weight.

In operation, the ingredients may be thoroughly batched and mixed (e.g., wholly or partially at vehicle 100) and then delivered to portable gun 212. The non-Portland cement based construction material may be carried via compressed air through the conduit 216 to nozzle 214. In one particular embodiment, potassium silicate, solid content 48%, density 1.52 g/cm3, Wt SiO2:K2O 1.14, and some liquid may be added and thoroughly mixed inside nozzle 214 in a short period of time (e.g., less than 1 second) before the partially liquefied mixture may be pneumatically applied to the surface of interest.

Embodiments included herein may include a mixture containing some or all of the following: slag (e.g., unnatural pozzolan, basis or latent hydraulic material), fly ash (e.g., unnatural pozzolan and optional in the recipe), geopolymer (e.g., natural pozzolan and optional, ground vulcano material/volcanic rock), alkali/alkaline component (e.g., powder or liquid), other liquids, including water (optional), and sand/grit or other aggregate. Examples of specific mixtures are provided below, however, it should be noted that the specific mixtures provided herein are included merely by way of example. Numerous additional and alternative embodiments are also within the scope of the present disclosure.

In one particular example, the non-Portland cement based construction material may be comprised of the following mixture:

TABLE 1

1 part ground granulated blast furnace slag (e.g., latent hydraulic material)
0.13 parts volcano rock flour (e.g., volcanic rock) or (alternatively fly ash or a mixture)
0.61 parts potassium silicate, Wt 1.14
1.35 parts of sand and/or grit In some embodiments, the components of the mixture may have a Blaine fineness of approximately 2500-5000 $cm^2$/g. The Blaine value is a standardized measure for the degree of pulverization of cement. The Blaine value is given as a specific surface value ($cm^2$/g) determined in a laboratory with a Blaine device. Standard Portland cement, CEM I 32.5, for example, has a Blaine value of 3,000 to 4,500. In some embodiments, the components of the binding agent mixture, volcanic rock and/or latent hydraulic material, may be used in a finely ground state, having a Blaine value greater than 3,000. In one embodiment, the volcanic rock and/or latent hydraulic material may have a Blaine value greater than 3,500. Finely ground components may result in a significantly improved reaction speed. Finely ground volcanic rock may be more easily processed, and furthermore may result in an increased resistance to a wide range of chemicals in the finished products, in particular to acids.

In another example, the non-Portland cement based construction material may be comprised of the following mixture:

TABLE 2

|  | Parts |
| --- | --- |
| Blast furnace slag | 0.5-1 |
| Fly Ash | 0-0.5 |
| Pozzolanic | 0-0.5 |
| Sand/grit | 1-2 |
| Potassium or sodium silicate liquid or powder (wt 1.0-3.5) | 0.2-2 |

In another example, the non-Portland cement based construction material may be comprised of the following mixture:

TABLE 3

|  | Recipe 1 parts | Recipe 2 parts | Recipe 3 parts |
| --- | --- | --- | --- |
| Blast Furnace Slag GGBS | 1 | 1 | 1 |
| Fly ash | 0.2 | 0.2 | 0.1 |
| Pozzolona volcano ash | 0.2 |  | 0.3 |
| Pozzolona Pumice grinded |  | 0.2 |  |
| Dry sodium silicate Wt 2.1, Na2O 27.5% | 0.7 |  |  |
| Potassium silicate SC 52%, density 1,65 g/cm3, Wt 1 |  | 0.6 | 0.6 |
| Sand | 1.35 | 1.35 | 1.35 |
| Water | 0.55 |  |  |

In some embodiments, instead of a hydraulically hardening binding agent, a non-Portland cement-based construction material or binding agent mixture, produced from the reaction of 4%-45% by weight volcanic rock, 0% (or greater than 0%)-40% by weight latent hydraulic material, 10%-45% by weight an alkaline component, and 20%-90% by weight aggregates, may be used. In some embodiments, the alkaline component may include sodium silicate, alkali hydroxide, and/or alkali carbonate. Additionally, the binding agent mixture may include sulfate ($SO_4^{2-}$) in the form of contaminants and/or in a portion of less than 1% by weight. In some embodiments, calcium may be included in the binding agent mixture in the form of calcium oxide (CaO) in a portion of no more than 5% by weight.

Embodiments of the non-Portland cement based construction material produced an unanticipated result as the reaction time of the alkaline ingredients with the rock flour was sufficient to generate a sticky compound. Through numerous tests, this compound was found to adhere extremely well on a vertical surface, builds a tight bonding and hardens within 3 days with compressive strength values above 50 N/mm² (8000 psi).

In some embodiments, binding agent mixtures or non-Portland cement based construction materials may be used in different technological fields of application:

Dry Mortar, Plasters and Sprayed Concrete

Dry mortar and plaster mixtures may be produced by mixing the dry components. For this, spray-dried, reactive silicates or alkali hydroxides may be used. Based on this, ready-made mixtures may be produced for the use thereof as sprayed concrete.

Aerated Concrete

Commercial aerated concrete is a mineral-based, autoclaved aerated, massive construction material having a raw density of 300 to 800 kg/m³. Aerated concrete is normally produced from raw materials such as lime, anhydrite, cement, water and siliceous sand, and may combine the properties of supporting structures and thermal insulation. Highly thermally insulated masonry constructions can be created with aerated concrete in monolithic, single-walled constructions.

In some embodiments, a production process may include grinding a siliceous sand until it is finely ground, e.g. in pebble mills, with Blaine values greater than 3,000. The ingredients may be combined to form a mortar mixture in a ratio of, e.g., 1:1:4 while adding water. In some embodiments, a small portion of aluminum powder or paste may be added to the finished suspension. The mortar mixture may be poured into troughs in which the metallic, fine particle aluminum forms hydrogen gas in the alkaline mortar suspension. Gas bubbles may be obtained, which foam the gradually hardening mortar. After 15 to 50 minutes, the end volume may be obtained. At this point, blocks of three to eight meters in length, one to one-and-one-half meters in width, and 50 to 80 centimeters in height may be obtained. These solid cakes or blocks may be cut to any desired size using wires. In some embodiments, these blocks may be cured in special steam pressure boilers, e.g., autoclaves, at temperatures of 180° C. to 200° C. in steam at an atmosphere of 10 to 12 bar in which the material may obtain its final characteristics after six to twelve hours. Chemically, the aerated concrete may correspond largely to the natural mineral tobermorite, but may be, however, a synthetic material.

In addition to the low thermal conductivity, the construction material may be distinguished by its lack of flammability, such that it may, for example, be classified in the European fire protection classification A1. The modern aerated concrete compositions may contain a mixture of quicklime, cement, sand, and water. Depending on the oven-dry densities, and the ratio of quicklime to cement, the compositions may be distinguished between lime-rich and cement-rich mixtures. In addition, sulfate carriers in the form of anhydrite or plaster may be used to improve the compressive strength and shrinkage properties, resulting from an improved development of the crystalline "house-of-cards" structure in tobermorite. As a result of these findings, it has been demonstrated over the course of the previous decade that the addition of sulfate carriers, in the form of anhydrite/plaster, is beneficial in production and therefore, is currently a component of all aerated concrete compositions.

The construction material may obtain a pore structure through the addition of a small amount of aluminum powder during the mixing process. The finely distributed aluminum in the mixture may react in an alkaline medium, forming hydrogen, which may slowly foam the raw mixture. This pore structure may remain in the product, even after the actual hydrothermal curing process, and may be substantially responsible for the characteristics of the end product.

In some embodiments, the production process may be broken down into one or more of the following actions:
1. Grinding the siliceous sand, and preparing the recirculated slurry
2. Mixing and pouring the aerated concrete slurry
3. Swelling, setting and cutting the rough cakes or blocks
4. Curing the uncut blocks under hydrothermal conditions
5. Packaging and storing the finished products After mixing and pouring the aerated concrete compound into the steel molds, numerous complex chemical reactions may occur between the setting and the hydrothermal curing phases. The hydration of the quicklime may begin during the mixing phase, when water is added. Because this is an exothermal reaction, the aerated concrete compound may heat up, and accelerate the hydration reaction of the cement phases. As a result, a continuous stiffening of the aerated concrete compound may occur during the swelling caused by the hydrogen development. In order to obtain a homogenous pore structure, the gas development may be adjusted to the viscosity curve of the swelling aerated concrete compound. If this is not achieved, structural damage, so-called swelling cracks, may occur during the swelling, which may not be corrected later during the production process. After a setting time period of a few hours, the uncut blocks may be cut into the appropriate rock formations by means of tensioned wires. All of the waste created during the cutting process may be recycled in the compositions, such that there is no waste during the production process.

The issue of recyclability is of primary importance for the future. On the one hand, European requirements demand a reduction in waste, which has been accompanied with closings of landfills and an increased demand for more recycling. On the other hand, there are increased demands with regard to environmental protection, such as minimum thresholds, and guidelines in the draft of the alternative building materials regulation in the framework of blanket regulations regarding groundwater/alternative building materials/soil conservation, which at least in some cases, makes recycling of building materials available in the market more difficult. The leaching behavior with regard to sulfate may be caused by sulfate concentrations in the eluate of between 900 and 1,650 mg/l. The threshold value for mineral-based alternative building materials is at 250 mg/l sulfate in the eluate, according to the alternative building materials regulations. Omitting sulfate carriers and cement in the production of aerated concrete may drastically reduce the aforementioned sulfate concentration in the eluate, and may enable use of aerated concrete construction waste as a mineral-based alternative building material.

In some embodiments, the use of non-cement based binders according to the present disclosure may eliminate this disadvantage, and furthermore may have a very low calcium content. The otherwise typical technical properties may not be affected.

Precast Concrete

A precast concrete part or concrete element is a component made of concrete, reinforced concrete, or pre-stressed concrete, which is prefabricated industrially in a plant, and is subsequently placed in its final position, often using a crane. Precast concrete elements and reinforced concrete elements are widely used, and implemented in various building techniques. The production of precast elements for open canalization may be used in some embodiments of the present disclosure.

Fire Protection

Plaster finishes for concrete elements and reinforced concrete elements are listed in DIN 4102 (Reaction to Fire of building materials and building elements). Plasters that are technically suitable as fire protection are vermiculite and perlite insulating plasters and plaster according to DIN 18550, Part 2.

In some embodiments, a spraying mixture may be supplied as a dry mortar
a mixture of mineral fibers, such as glass wool, rock wool, or mineral wool, having a hydraulically hardening binding agent and mixed with water immediately before application. The technical characteristics regarding fire protection may be the same as those of sprayed asbestos.

The use of non-cement based binding agents in plaster finishes may further improve fire resistance, because a non-cement based binder may have a more favorable expansion behavior, and may exhibit lower shrinkage at high temperatures.

In some embodiments of the present disclosure, conventional mixers may not be used for the production of the binding agent mixture. In some embodiments, the use of a so-called kneader or continuous mixer for producing a pre-mixture, and subsequently an intensive mixer or planetary mixer for mixing in the aggregates, may result in an inorganic material that may be compressed or enclosed in molds and may produce the desired product after a mechanical compression.

Table 4, provided below, shows which mixing and application techniques may lead to which field of application for the binding agent mixtures according embodiments to the present disclosure.

TABLE 4

| Mixing technique | Product | Application technique for processing | Field of Application |
| --- | --- | --- | --- |
| Kneader and mixer | earth-moist concrete | compressing & shaking | concrete block tubes (canalization) precast elements (open canalization) railroad ties |
| | ready-mixed concrete | pouring | facades/exposed concrete floors |
| spray nozzle | mortar suspension sprayed concrete made with a dry or wet mixing technique | centrifugation foaming | columns aerated concrete tunnel construction bridge restoration sewer restoration fire protection |
| dry mixer | dry mixtures | | concrete restoration fire protection |

In some embodiments of the present disclosure, a method for the production of a moldable concrete compound is provided. The method may include one or more of the following actions:

The method may include provision of a binding agent mixture containing one or more of 4% to 45% by weight volcanic rock, 0% to 40% by weight latent hydraulic material, 10% to 45% by weight an alkaline component. In one example, the alkaline component or alkali may be selected from the group and/or may include: sodium silicate, alkali hydroxide, alkali carbonate, and mixtures thereof. In some embodiments, sulfate ($SO_4^{2-}$) may be contained in the binding agent mixture in the form of contaminants in the binding agent mixture, and in a portion of less than 1% by weight. Additionally, calcium may be contained in the binding agent mixture in the form of calcium oxide (CaO) in a portion of no more than 5% by weight. The method may also include production of a pre-mixture of the binding agent mixture using a kneader or continuous mixer. In some embodiments, the method may further include mixing the pre-mixture with 20% to 90% aggregates, by weight, using an intensive or planetary mixer to produce a moldable concrete compound. In some embodiments, this may be carried out for a time period of 1 to 5 minutes. In one embodiment, this may be carried out for a time period of approximately 2 minutes.

The method may also include compressing the moldable concrete compound through compression or shaking in order to form tubes, precast concrete elements, railroad ties, concrete blocks, forming paving stones, sidewalk slabs, etc.

In some embodiments of the present disclosure, a method for producing a moldable concrete compound is provided. The method may include one or more of the embodiments shown below.

In some embodiments, the method may include provision of a binding agent mixture including one or more of 4% to 45% by weight, volcanic rock, 0% to 40% by weight, latent hydraulic material, 10% to 45% by weight, an alkaline component. In some embodiments, the alkaline component may be selected from the group and/or may include: sodium silicate, alkali hydroxide, alkali carbonate, and mixtures thereof. In one example, the binding agent mixture may include 20% to 90% by weight, aggregates. In some embodiments, sulfate ($SO_4^{2-}$) may be contained in the binding agent mixture in the form of contaminants, and in a portion of less than 1% by weight. Additionally, calcium may be contained in the binding agent mixture in the form of calcium oxide (CaO) in a portion of no more than 5% by weight. The method may also include producing a dry mixture using a dry mixer. The method may further include mixing the dry mixture produced with water using an intensive or planetary mixer to produce a moldable concrete compound.

In some embodiments of the present disclosure, a method for producing a sprayable concrete compound may be provided. The method may include one or more of the embodiments shown below.

In some embodiments, the method may include provision of a binding agent mixture including one or more of 4% to 45% by weight volcanic rock, 0% to 40% by weight latent hydraulic material, 10% to 45% by weight an alkaline component. In some embodiments, the alkaline component may be selected from the group and/or may include: sodium silicate, alkali hydroxide, alkali carbonate, and mixtures thereof. In some embodiments, the binding agent mixture may include 20% to 90% by weight aggregates. In some embodiments, sulfate ($SO4^{2-}$) may be contained in the binding agent mixture in the form of contaminants, and in a portion of less than 1% by weight. Additionally, calcium may be contained in the binding agent mixture in the form of calcium oxide (CaO) in a portion of no more than 5% by weight. The method may also include producing a dry mixture using a dry mixer. In some embodiments, the method may further include mixing the dry mixture with water in a spray gun for the production and immediate application of a sprayable concrete compound.

In some embodiments, binding agent mixtures may be prepared for different fields of application, including, for example, those listed in Table 4 above. Examples 1-5, provided below, may illustrate one or more embodiments of the present disclosure.

Example 1

In a mixing and kneading machine, having an extruding screw, 1 part finely ground volcanic rock (e.g., Blaine value 3,500), 0.15 parts fly ash, and 0.8 parts sodium silicate may be combined, and mixed energetically, until a homogenous, pourable paste is obtained.

This paste may be mixed in an intensive mixer (or planetary mixer) with 4 parts basalt and sand for ca. 2 minutes. An earth-moist, cement-free concrete may be obtained thereby, suitable for application as face concrete in the production of concrete blocks.

The sulfate content of the mixture may amount to 0.16% by weight and the calcium oxide content may be 0.8% by weight.

The compression of such a mixture may be achieved through compression and shaking, as is practiced, for example, in block machines.

The resulting products may be distinguished by a significantly higher acid resistance, more favorable mechanical strength properties and a significantly more intense color impression.

When other aggregate mixtures are used, such as gravel and sand, concrete tubes or special precast concrete elements may also be produced, depending on a specific particle-size distribution curve. Other product variations are possible by controlling the moisture content and adapting the application technology (e.g., pouring, centrifugation, etc.).

Example 2

In an intensive mixer, 0.2 parts granulated slag, 1 part finely ground volcanic rock and 3 parts sand may be mixed. This dry mixture may be placed in a bag.

At a construction site, 1 part of the mixture produced in this manner may be mixed in a pavement mixture with 0.7 parts sodium silicate, and brought to the desired consistency.

The sulfate content of the mixture may amount to 0.19% by weight and the calcium oxide content may be 0.57% by weight.

The non-cement based masonry and plastering mortar obtained in this manner may be applied in different ways to a surface that is to be coated, (e.g., by conventional plastering, spraying, etc.).

Example 3

In a dry mixer, a dry mixture may be produced, composed of 1 part volcanic pozzolan (e.g., Blaine value greater than 3,500), 0.4 parts fly ash, 1 part perlite, and 0.7 parts powdered sodium silicate.

The dry mixture may be moistened with water through intense mixing with high shearing forces, poured into molds, and compressed.

The sulfate content of the moist mixture may amount to 0.32% by weight and the calcium oxide content may be 1.8% by weight.

In one exercise based on the above example, samples were obtained after a hardening phase, which, after being subjected to flame for an extended period of time, did not display breaks nor visible cracks, nor did they exhibit reduced mechanical strength properties after testing. Nor was any damage apparent after being subjected to freezing temperatures.

Example 4

In a dry mixer, a dry mixture composed of 1 part volcanic pozzolan (e.g., Blaine value greater than 3,500), 0.4 parts granulated slag, 1 part perlite and 0.7 parts powdered sodium silicate may be produced.

The dry mixture may be continuously supplied to a spray gun, and may be combined with water to generate a sprayable concrete. Tubes and cable penetrations, heat-sensitive building materials and surface may be sealed or coated without difficulty with the spraying technique with heat resistant and fireproof non-cement based compounds.

The sulfate content of the sprayable concrete may amount to 0.31% by weight and the calcium oxide content may be 1.29% by weight.

Example 5

For the production of an aerated concrete, 16.2 parts volcanic rock, 3.35 parts fly ash, 23 parts siliceous sand may be intensively pre-mixed in an commercially available mixer. This dry mixture can be added to 33 parts sodium silicate under strong shearing forces, at 38° C., and can be mixed further in the same mixer with 0.43 parts aluminum paste.

The binding agent mixture can be poured into a Teflon mold, and heated in the mold for 120 min to 80° C. The mixture may become rigid while increasing strongly in volume, but can still be cut. For the curing, the mold may be placed in a curing chamber, and may remain therein for 30 min at 180° C. Alternatively, an autoclave may be used at 120° C.

A molded body may be obtained, having comparable optical properties to an aerated concrete obtained according to typical methods. In differing from typical aerated concrete, the material may be acid resistant, and with a sulfate content of 0.21% by weight and a calcium oxide content of 0.6% by weight. In one embodiment, the resulting construction material may have a very low sulfate and calcium content.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A method for producing a sprayable concrete compound,
comprising:
mixing one or more of 4%-45% non-pumice based volcanic rock by weight, greater than 0%-40% latent hydraulic material by weight, 10%-45% alkaline component by weight, and 20%-90% aggregate by weight to produce a dry binding agent mixture, using a dry mixer; and
combining the dry binding agent mixture with water at a nozzle to produce a sprayable concrete compound.

2. The method of claim 1, wherein the dry binding agent mixture includes less than 1% sulfate by weight.

3. The method of claim 1, wherein the dry binding agent mixture includes less than 5% calcium by weight.

4. A method for producing a moldable concrete compound comprising:
mixing one or more of 4%-45% non-pumice based volcanic rock by weight, greater than 0%-40% latent hydraulic material by weight, 10%-45% alkaline component by weight, and 20%-90% aggregate by weight to produce a dry binding agent mixture, using a dry mixer; and
combining the dry binding agent mixture with water using a planetary mixer to produce a moldable concrete compound.

* * * * *